United States Patent
Lewis et al.

(10) Patent No.: US 6,421,719 B1
(45) Date of Patent: Jul. 16, 2002

(54) METHOD AND APPARATUS FOR REACTIVE AND DELIBERATIVE CONFIGURATION MANAGEMENT

(75) Inventors: Lundy Lewis, Mason; Rajiv Malik; Steve Sycamore, both of Nashua; Utpal Datta, Bedford; Giff Hammar, Durham, all of NH (US)

(73) Assignee: Aprisma Management Technologies, Inc., Durham, NH (US)

( * ) Notice: Subject to any disclaimer, the term of this patent is extended or adjusted under 35 U.S.C. 154(b) by 0 days.

(21) Appl. No.: 09/164,139

(22) Filed: Sep. 30, 1998

Related U.S. Application Data (63) Continuation-in-part of application No. 08/855,222, filed on May 13, 1997, now Pat. No. 6,209,033, and a continuation of application No. 08/622,866, filed on Mar. 29, 1996, now Pat. No. 5,889,953, which is a continuation-in-part of application No. 08/450,854, filed on May 25, 1995, now Pat. No. 5,872,928.

(51) Int. Cl.⁷ ............................................. G06F 15/173
(52) U.S. Cl. ....................... 709/224; 709/223; 709/220; 709/221
(58) Field of Search ................................. 709/223, 224, 709/217, 219, 220, 221; 345/418; 455/437

(56) References Cited

U.S. PATENT DOCUMENTS

| | | | | |
|---|---|---|---|---|
| 5,261,044 A | * | 11/1993 | Dev et al. .................... | 345/855 |
| 5,436,909 A | * | 7/1995 | Dev et al. ....................... | 714/4 |
| 5,504,921 A | * | 4/1996 | Dev et al. .................... | 709/223 |
| 5,598,532 A | * | 1/1997 | Liroa .......................... | 709/220 |
| 5,680,326 A | * | 10/1997 | Russ et al. ...................... | 714/4 |
| 5,706,436 A | * | 1/1998 | Lewis et al. ................. | 709/235 |
| 5,713,075 A | * | 1/1998 | Threadgill et al. ........... | 455/427 |
| 5,822,586 A | * | 10/1998 | Strutt et al. .................. | 709/328 |
| 5,832,503 A | * | 11/1998 | Malik et al. ................. | 709/223 |
| 5,889,953 A | * | 3/1999 | Thebaut et al. ............. | 709/221 |
| 5,958,009 A | * | 9/1999 | Friedrich et al. ............ | 709/224 |
| 6,012,152 A | * | 1/2000 | Douik et al. ................... | 714/26 |
| 6,122,664 A | * | 9/2000 | Boukobza et al. ........... | 709/224 |
| 6,209,033 B1 | * | 3/2001 | Datta et al. .................. | 709/224 |

* cited by examiner

Primary Examiner—Mehmet B. Geckil
(74) Attorney, Agent, or Firm—Wolf, Greenfield, and Sacks, P.C.

(57) ABSTRACT

Configuration management of managed objects is performed based upon performance data. Configuration management is performed on varying levels according to the amount of interpretation of the performance data that is required. A new configuration for an object is determined based upon the performance data, and the object is reconfigured according to the new configuration. Analysis may be performed at varying levels by a reactive analyzer and a deliberative analyzer.

21 Claims, 9 Drawing Sheets

```
09:30 AM WED JAN 26 1994                    PAGE 1
           SPECTRUM CONFIGURATION MANAGER
TEMPLATE LISTING FOR NEW_CONFIG_TEMPLATE
ATTRIBUTE
AT_IF_INDEX
AT_NET_ADDR
AT_PHYS_ADDR           09:24 AM WED JAN 26 1994                    PAGE 1
APPS_CREATED_STATE                SPECTRUM CONFIGURATION MANAGER
AUTOPLACEOFFSETX       CONFIGURATION LISTINGS FOR NEW_CONFIG
AUTOPLACEOFFSETY       ATTRIBUTE                        VALUE
AUTOPLACESTARTX        AT_IF_INDEX2.1.132.177.141.10    2
AUTOPLACESTARTY        AT_NET_ADDR.2.1.132.177.141.1    86.8D.8F.1
COMMUNITY_NAME         AT_PHYS_ADDR.2.1.132.177.141.1   0.0.C.4.E3.63
CONDITION              APPS_CREATED_STATE               1
CONDITION_VALUE        AUTOPLACEOFFSETX                 0
CONTACTPERSON          AUTOPLACEOFFSETY                 30
CONTACT_STATUS         AUTOPLACESTARTX                  100
DATARELAYCLASS         AUTOPLACESTARTY                  50
DESC_KEY_WORD          COMMUNITY_NAME                   PUBLIC
DEV_CONTACT_STATUS     CONDITION                        6
DEVICETYPE             CONDITION_VALUE                  0
DEVICE_NAME            CONTACTPERSON                    LISA
DEVICE_TYPE            CONTACT_STATUS                   2
DISPOSABLE_PRECEDENCE  DATARELAYCLASS                   4
EDIT_COUNT             DESC_KEY_WORD                    8.2(4):8.2(5)
GENERALDISCCLASS       DEV_CONTACT_STATUS               2
SYSNAME                DEVICETYPE                       CISCOMIM
SYSTEM_OID_VERIFY      DEVICE_NAME                      <NO VALUE>
SYSTEM_UP_TIME         DEVICE_TYPE                      <NO VALUE>
TIMEOUT                DISPOSABLE_PRECEDENCE            10
TRYCOUNT               EDIT_COUNT                       1
VIB_DISPLAY_LIST       GENERALDISCCLASS                 1
VIB_RASTER_NAME        SYSNAME                          ENAX
VALUE_WHEN_ORANGE      SYSTEM_OID_VERIFY                1.3.6.1.4.1.9.1.5
VALUE_WHEN_RED         SYSTEM_UP_TIME                   180337411
VALUE_WHEN_YELLOW      TIMEOUT                          3000
ZOOM_FACTOR            TRYCOUNT                         3
ATTR_TO_READ           VIB_DISPLAY_LIST                 0.0.0.0.6D.73.0.F8
                       VIB_RASTER_NAME                  DEFAULT.CSI
       TEMPLATE        VALUE_WHEN_ORANGE                3
                       VALUE_WHEN_RED                   7
          CONFIGURATION VALUE_WHEN_YELLOW               1
                       ZOOM_FACTOR                      100
                       ATTR_TO_READ                     230006
```

| Source-Destination | Links Used |
|---|---|
| A-B | 2-6, 2-4, 4-8 |
| A-C | 2-6, 2-4, 1-4, 1-5 |
| A-D | 2-6, 2-3, 3-7 |
| A-E | 2-6, 2-4, 1-4, 1-5 |
| B-C | 4-8, 2-4, 1-2, 1-5 |
| B-D | 4-8, 3-4, 3-7 |
| B-E | 4-8, 2-4, 1-2, 1-6 |
| C-D | 1-5, 1-3, 3-7 |
| C-E | 1-5, 1-6 |
| D-E | 3-7, 1-3, 1-6 |

METHOD AND APPARATUS FOR REACTIVE AND DELIBERATIVE CONFIGURATION MANAGEMENT

CROSS-REFERENCE TO RELATED APPLICATIONS

This is a continuation-in-part of application Ser. No. 08/855,222, by U. Datta and L. Lewis, entitled APPARATUS AND METHOD FOR NETWORK CAPACITY EVALUATION AND PLANNING, filed May 13, 1997 now U.S. Pat. No. 6,209,033. This is also a continuation of application Ser. No. 08/622,866, filed Mar. 29, 1996, now U.S. Pat. No. 5,889,953, which is a continuation application Ser. No. 08/450,854, filed May 25, 1995, now U.S. Pat. No. 5,872,928.

FIELD OF THE INVENTION

The present invention is directed to configuration management of communication networks, and more specifically to a method and apparatus for configuring managed objects in a reactive or deliberative manner.

BACKGROUND OF THE INVENTION

Configuration management is a process for identifying and controlling managed objects. In a communications network, these managed objects may represent concrete objects such as source/destination devices (end stations) that are attached to the network and intervening network devices such as servers, applications, routers, switches, hubs, bridges, etc. Devices may also be accessed through serial lines or similar devices or other method of communication. Managed objects may also represent abstract objects such as computer processes, software applications, business processes, and services. As used herein, objects include both concrete and abstract managed objects.

Configuration management functions include: maintaining an inventory of network objects; knowing the configuration of each object; resetting or updating configurations as the need arises; scheduling configuration changes; adding and deleting users and resources on the network; and changing resource operating parameters. For example, configuration management generally allows a network administrator to:

make changes in a configuration of a device to improve performance of the object;

initially configure network services provided by or associated with an object;

make changes in network services provided by or associated with an object;

identify, browse, or store a configuration of an object.

A "configuration" is a set of attributes that govern the operational characteristics of a object. The configuration may include, for example, port thresholds, operating state of a switch, access information, and the like. Objects that are configured routinely in communications networks include network devices such as routers, switches, bridges, and hubs. Configuration information is typically entered/changed/deleted manually (i.e., through a dumb terminal), or manually/automatically by a network management system executing what is referred to as a configuration management program.

For example, when managing a device manually using a dumb terminal, the terminal is physically attached to the network device and the network administrator issues commands through the terminal's keyboard. Alternatively, the network device is accessed remotely using an application that establishes a terminal connection to the device through a communications network. For example, an administrator may use the Telnet application at a remote station to establish a Telnet terminal session to the device. The administrator issues commands which are transferred to the device through the network via the application (using the TCP/IP protocol) and then executed on the device.

Another manual method utilizes a configuration management program residing on a general purpose computer, and executed by a network administrator. The administrator must manually provide the program with the configurations of the networking devices, or otherwise interpret performance data to determine new configurations. Examples of configuration management programs include SITE MANAGER available from Bay Networks Inc., Santa Clara, Calif., USA, and CISCOWORKS available from Cisco Systems Inc., Menlo Park, Calif., USA.

In general, manual methods require significant user (administrator) interaction. In large networks having many devices, manual configuration of these devices is tedious and time-consuming for the administrator, and is susceptible to human error. Because of a continuing need for alleviating burdens on the network administrator, automatic methods of network management that require less user interaction have been developed.

Automatic configuration management programs generally allow a network administrator to automate portions of certain labor-intensive tasks, e.g., loading new configurations in a number of routers, upgrading router software, or gathering configuration data. However, such automatic configuration programs are still not capable of loading configurations without user intervention or programming. Thus, a significant amount of user intervention is still required to operate such programs.

Another disadvantage of known methods is that changes are determined by a network administrator having limited information about the network, and without support of exacting numeric methods or expert knowledge. Also, some configuration changes are not optimum for all periods of time, e.g., a special configuration is required because of network performance degradation during a specific time period, but is not optimum for other time periods. Furthermore, manual configuration changes may not be executed consistently throughout the network.

Still further, some configuration changes need to be made quickly while others should be made based on data gathered over a long period of time. The process of collecting configurations, analyzing the information, and formulating new configuration information in response to the analysis is a lengthy, time-consuming process. Thus, manual methods do not allow a network manager to react with sufficient speed to implement configurations in an adequate manner. A method which automates such analysis and configuration tasks would be advantageous.

There is therefore need for a system and method for automatic configuration management of networking devices that optimizes configurations for a designated time period and/or reduces the amount of user intervention and analysis required.

SUMMARY OF THE INVENTION

In accordance with one aspect of the present invention, a system and method are provided for the automatic configuration management of network devices, in which an analyzer processes a current configuration of a network device and network performance data and provides an updated configuration to the network device to enhance performance of the device. The system and method may determine the updated configuration based on network management data indicative of network performance. Configuration management may be performed on varying levels according to the amount of interpretation (processing) of the performance data that is required, the time available to perform a configuration task (urgency), or the amount of time required to collect the performance data. Analysis of the performance data may be performed at varying levels by a reactive analyzer and a deliberative analyzer. A reactive analyzer may be, for example, a rule-based event handler, a case-based reasoning structure, a neural network analyzer, threshold function, or model-based reasoning structure. A deliberative analyzer may be, for example, a capacity planner or network administrator.

In one embodiment, a configuration management system comprises a performance monitor, an event handler, a capacity planner, and a configuration manager. The performance monitor monitors the network and provides as an output performance data of the network. The event handler receives the network performance data as an input and evaluates the performance data based upon a rule set; the event handler also provides, as an output, an evaluation of the performance data. The capacity planner also receives the network performance data from the monitor and provides as an output an evaluation of the capacity of the communications network. The configuration manager receives as a first input the output of the event handler, and as a second input the output of the capacity planner. The output of the configuration manager is a command to the network device based on the performance evaluation and the capacity evaluation.

According to a method/embodiment for configuring a network device in a communications network, the method includes the steps of: a) collecting performance data from the communications network; b) evaluating the performance data according to a set of rules to generate a rule evaluation; c) determining a capacity evaluation of the network; d) determining a configuration for the network device based upon the rule evaluation and the capacity evaluation; and e) configuring the device based on the determined configuration.

Another aspect is directed to an apparatus for configuring a network device in a communications network, the apparatus comprising means for collecting performance data from the communications network, means for evaluating the performance data according to a set of rules to generate a rule evaluation, means for determining a capacity evaluation of the network, means for determining a new configuration for the network device based upon the rule evaluation and the capacity evaluation, and means for reconfiguring the device based on the new configuration.

Reconfiguration of a network device may include issuing commands for a new configuration of the device based upon a capacity evaluation. The rule evaluation may be synthesized with the capacity evaluation to provide a single synthesized network evaluation. In at least one embodiment, the synthesis includes resolving one or more conflicts between a configuration determined by the rule evaluation and a configuration determined by the capacity evaluation.

In any of the above embodiments, the success of a reconfiguration command to a network device may be verified by determining whether performance of the communications network has improved subsequent to the command being provided to the network device. Such an operation may include determining whether the network has improved performance (subsequent to the device being reconfigured) based upon an evaluation of a network performance characteristic such as network capacity.

These and other features and benefits of this invention are further described in the following detailed description and drawings.

BRIEF DESCRIPTION OF THE DRAWINGS

FIG. 1B shows a known (prior art) template listing and configuration listing associated with a configuration record;

DETAILED DESCRIPTION

In accordance with one embodiment of the present invention, configuration management includes identifying, controlling, and monitoring managed objects in a communications network. A managed object is any object that is modeled in a network management system (NMS), such as the SPECTRUM NMS available from Cabletron Systems, Inc., Rochester, N.H., USA. The managed objects include not only hardware devices such as personal computers (PCS), workstations, hubs and routers, but also other entities such as software applications, business processes, computer processes, and services.

A known configuration management system is provided as a part of the SPECTRUM network management system available from Cabletron Systems, Inc. and is described in U.S. Pat. No. 5,832,503, issued Nov. 3, 1998 to R. Malik et al., which is hereby incorporated by reference in its entirety. The SPECTRUM network management system is also described in U.S. Pat. No. 5,261,044, issued Nov. 9, 1993 to R. Dev et al.; U.S. Pat. No. 5,436,909, issued Aug. 25, 1995 to R. Dev et al.; and U.S. Pat. No. 5,504,921 issued Apr. 2, 1996 to R. Dev et al.; which are hereby incorporated by reference in their entirety. A method for managing business processes is described in U.S. Ser. No. 09/058,054 filed Apr. 9, 1998 by L. Lewis et al., which is incorporated by reference in its entirety.

Figure 1A:
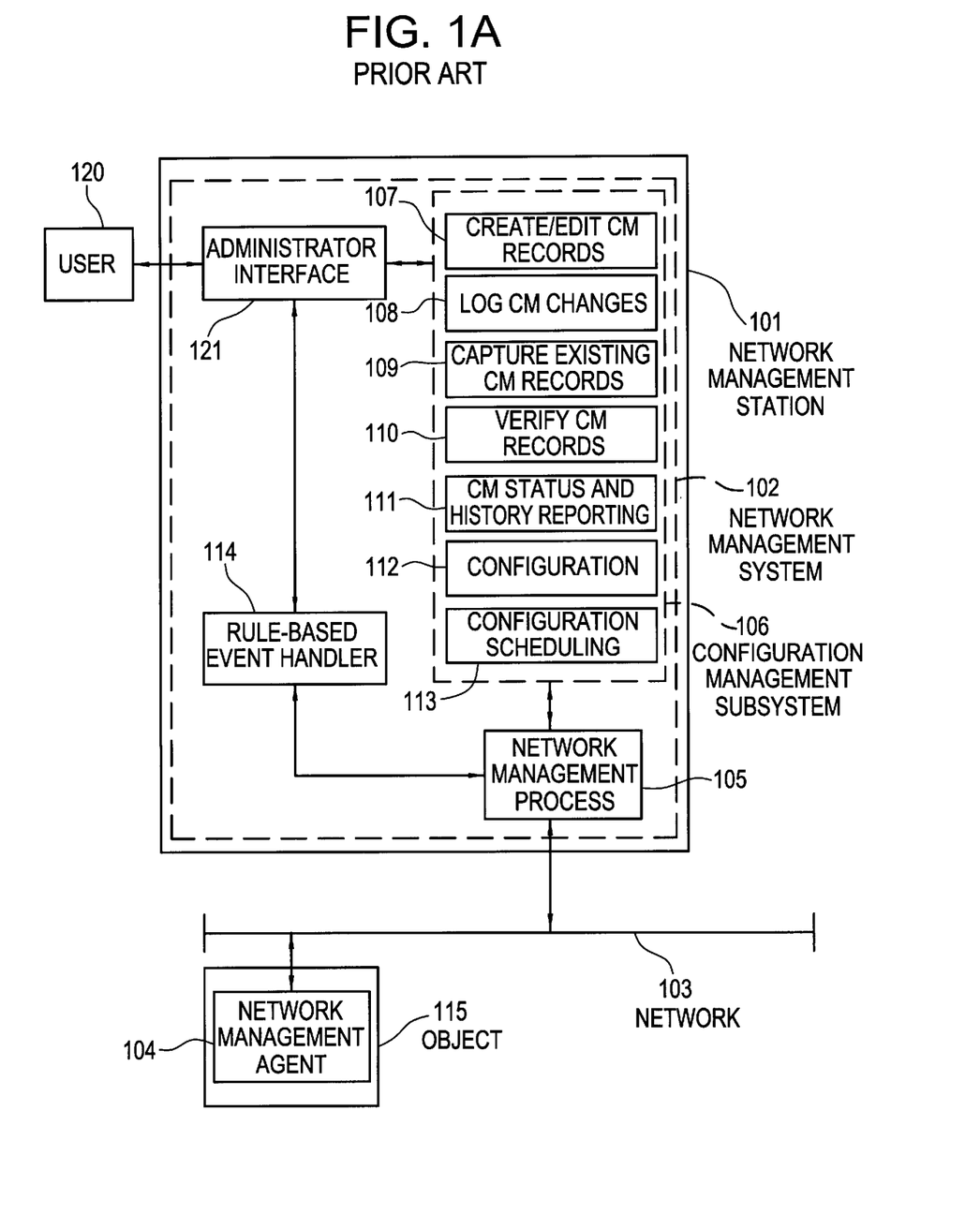
FIG. 1A is a block diagram of a known (prior art) network management system which may be used in implementing an embodiment of the present invention.

As shown in FIG. 1A, a known network management (NM) station 101, for example running a copy of the SPECTRUM NMS, continually monitors network 103 and maintains a database of information about managed objects in the network. The NM station 101 obtains the values of certain attributes, i.e. data which define characteristics of an NM agent 104 included within an object 115. For example, object 115 may be a device attached to the distributed network 103. The NM agent 104 is generally a process executed in a managed object 115 that interacts with the NM station 101. Managed object 115 may include one or more NM agents 104. There are typically a plurality of such managed objects 115, each having an NM agent 104. The NM station 101 may obtain information from agent 104 using a well-known network management protocol, such as SNMP; it should be understood that other network management protocols may be used.

Within NM system 102, a configuration management (CM) subsystem 106 maintains configuration data obtained from NM agent 104. The CM subsystem 106 enables a system administrator 120, via an administrator interface 121, to access a configuration of NM agent 104. For example, the administrator may create a new configuration, load this configuration in object 115 on the distributed network 103, and verify whether the configuration has changed in accordance with the new configuration.

More specifically, the existing NM system 102 allows a user 120, through an administrator interface 121, to create and edit configuration management (CM) records 107, log (store) CM changes 108 and capture (retrieve) existing CM records 109 from NM agent 104. The existing NM system also allows a user 120 to verify CM records 110 and obtain CM status and history reporting 111. Also, upon receiving an event, the existing CM subsystem 106 may send (download) a configuration 112 to object 115. The existing CM subsystem 106 also allows a user 120 to perform configuration scheduling 113 for downloading configurations to object 115.

As discussed above, NM station 101 may communicate configuration changes through NM agent 104. Specifically, NM station 101 generally communicates with the NM agent 104 through a NM process 105; the process may use a standard network management protocol, such as SNMP. Other network management protocols are available. The NM process 105 includes all of the communication libraries necessary to communicate with NM agent 104 and the required libraries to receive events from network devices. In addition, the NM system 102 includes a rule-based event handler 114 to handle events received from network devices according to predetermined and/or user defined rules. The rule-based event handler 114 provides additional actions for the NM system 102, such as creating events in a log file or contacting an administrator with event information.

Network 103 may be a data communications network, such as Ethernet. It should be understood that the NM process 105 may communicate over any type of communications network including local area networks (LANs), wide area networks (WANs), dial-up networks, or the like.

The existing CM subsystem 106 enables a user 120 to create configurations with a template. A template is a list of attributes for a device of a certain model type. When creating a template, the configuration manager provides the user 120 with a list of attributes for a model type. The user 120 then selects the attributes needed for the template, which, depending on the purpose of the template, might include one or many attributes. Templates may be defined and stored in the CM subsystem 106, anywhere on NM station 101, or other location.

The CM subsystem 106 then captures the values of the attributes listed in the template, by retrieving the values from a model of the managed object 115. Modeling of managed objects is described further below. Alternatively, values of attributes may be obtained directly from the managed object, such as through polling using SNMP. Subsystem 106 generally retrieves values by executing NM commands through NM process 105. The template functions as a filter, blocking out unwanted attributes and capturing values of those attributes found in the template.

The resulting configuration created with the template contains the attributes from the template and the values collected from the model. The configuration may be stored in the CM subsystem 106, anywhere on the NM station 101, or other location. The configuration may be stored in a configuration file or record which is entered in a database or file system.

FIG. 1B illustrates a template and a configuration. Item 130 is a template for "new_config_template" which includes a list of attributes set forth below the heading "ATTRIBUTE". Item 131 is the corresponding configuration for "new_config" which includes a list of attributes on the left and corresponding values on the right. This configuration includes data that can be downloaded to and stored in a network device 115 to reconfigure operating parameters of the network device 115.

As discussed above, the CM subsystem 106 may, through the NM process 105, load a configuration to the NM agent 104. The configuration may be loaded by placing values of the configuration attributes into a selected model, the model reflecting data entries for the NM agent 104.

As previously discussed, SPECTRUM is a model-based network management system described in U.S. Pat. No. 5,261,044, issued Nov. 9, 1993 to R. Dev et al., and hereby incorporated by reference in its entirety. In summary, SPECTRUM is a system for maintaining and processing information pertaining to the condition of the computer network and providing the same to a user, the network including a plurality of network entities such as computer devices and software applications being executed on such devices.

Network management system 102 includes a "virtual network" machine, comprising a digital computer implementing an object-oriented programming language such as C++, Java, Eiffel, Smalltalk, and Ada. The virtual network comprises interrelated intelligent models of network entities and relations between network entities, including means for acquiring network data pertaining to the condition of a network entity. The virtual network further includes means for maintaining objects which include network data relating to corresponding network entities and one or more inference handlers for processing the network data; the inference handlers are responsive to changes occurring in the same and/or a different object, and/or changes or events in the network or NM system 102. The network data can then be transferred to a user interface coupled to the virtual network, for supplying the network data to a user. Thus, the models are implemented as software objects containing both data (attributes) relating to the corresponding network entity and one or more inference handlers (functions) for processing the data.

The inference handlers are initiated by predetermined virtual network events, such as a change in specified network data in a network device model, a change in specified network data in a different model, and predefined events or changes in models or model relations. Information pertaining to the condition of the network device can be received from the network entity or may be inferred from data contained within other models. An alarm condition may be generated when the network data meets a predetermined criteria. Events, alarms and statistical information from the distributed network 103 are stored in a database and are selectively displayed for the user 120. In the SPECTRUM system, this database is referred to as the SpectroSERVER database.

Figure 1C:
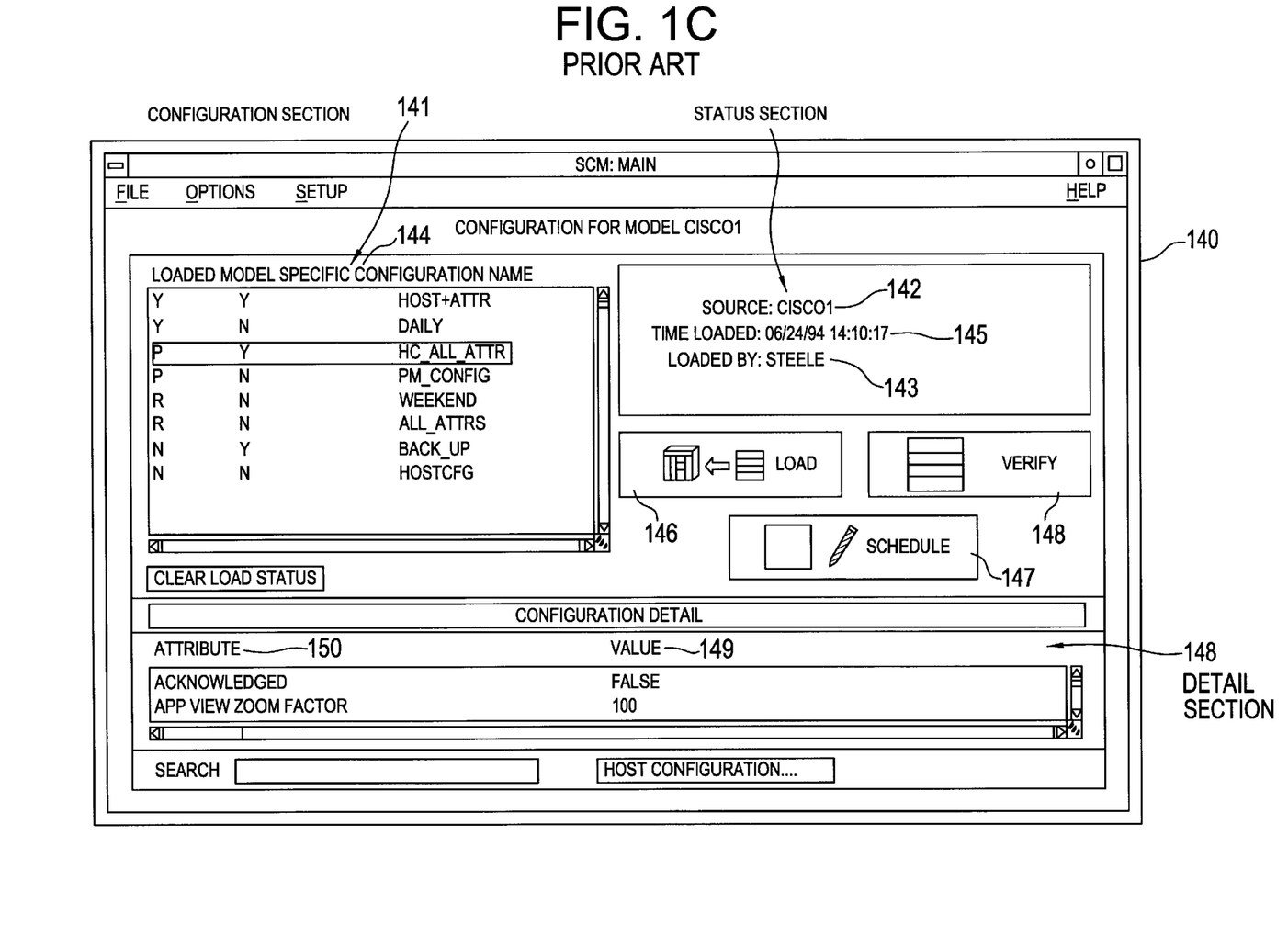
FIG. 1C shows a known (prior art) graphical interface of a configuration management system.

FIG. 1C shows a configuration management display screen 140 as implemented on a SPECTROGRAPH display of the SPECTRUM system. The display 140 includes a configuration section 141 which lists available configurations by name 144 and information about the selected configuration in other fields. The configurations shown in this example relate to the model "CISCO1" 142 (a model for a router made by Cisco Systems) previously selected by the user 143, as indicated on the display 140. The configurations listed in section 141 can be loaded to the selected model or to other models of the same model type, and further to schedule automatic loads as described below. The load and schedule operations are initiated by selecting the icons 146 and 147, respectively. The verify operation, designated by icon 148, enables the user to verify the configuration of the selected model or models, and also to schedule automatic verifications of the network devices. Thus, the existing CM subsystem 106 allows a user 120 to schedule configuration loads, captures, and verifications during different time periods. In addition, subsystem 106 allows the user to maintain more stable configurations by scheduling automatic loads at regular intervals and checking the integrity of the network with periodic automatic captures and verifications of configurations. However, the network management system typically requires manual intervention for determining correct configuration management settings for each network device and, in a large network, creating such configurations manually for each network device is a time-consuming and inaccurate operation.

Figure 1D:
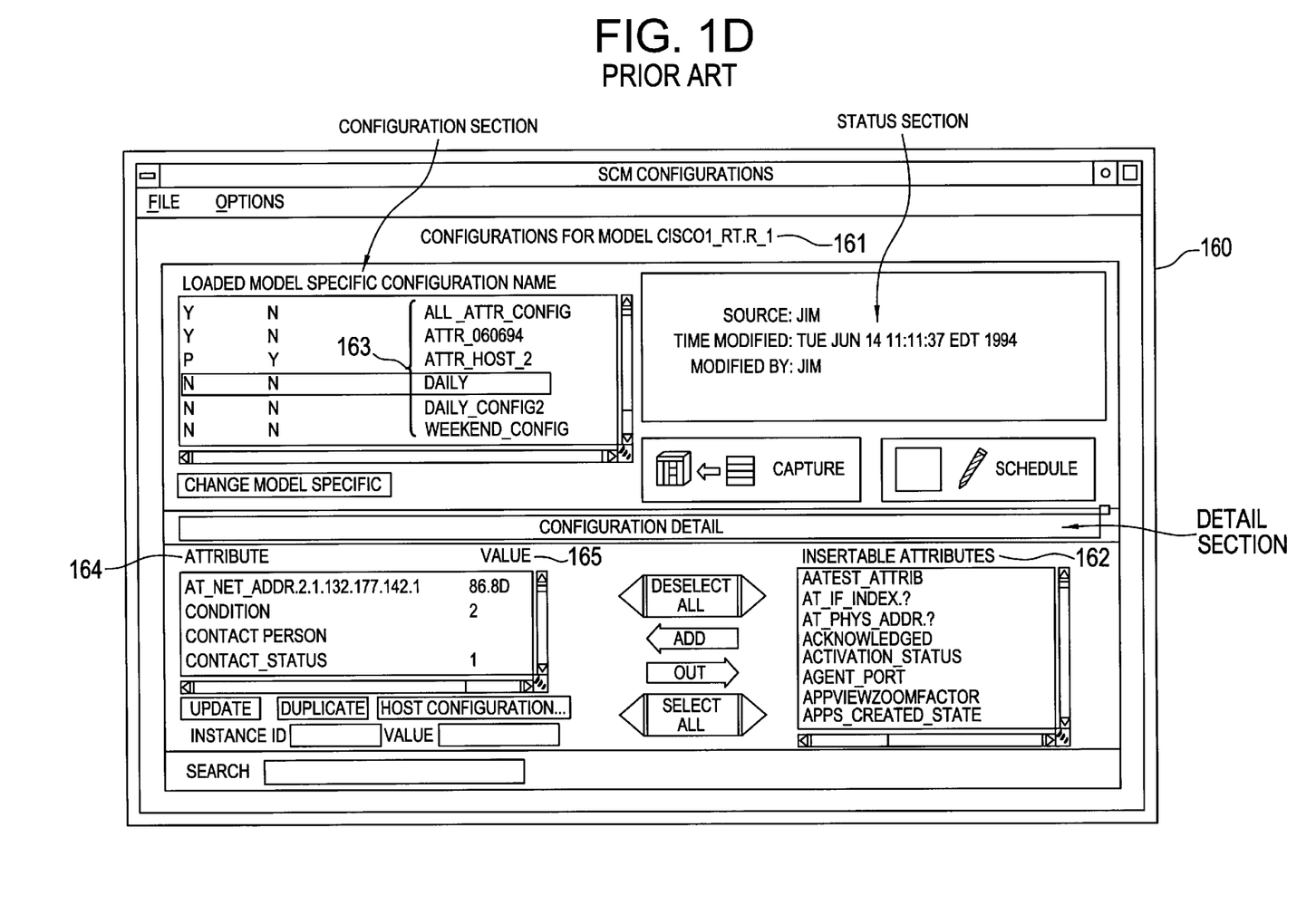
FIG. 1D shows another known (prior art) graphical interface of a configuration management system.

As discussed above, configuration data includes attributes 150 and values 149. In display 140 of FIG. 1C, attributes 150 and values 149 associated with a configuration may be viewed and edited. Alternatively, as shown in FIG. 1D, a list of configurations 161 for a model "CISCORTR_1" is shown which includes a number of configurations 163 having attributes 164 and values 165. A user may through display interface 160, insert or delete attributes chosen by the user from a list of insertable attributes 162. Interface 160 allows a user to construct configuration records by selecting, adding, and deleting attributes.

There will now be described an embodiment of the present invention—an intelligent system for automatically configuring. As shown in the functional block diagram of FIG. 2, an automatic configuration management (CM) subsystem 200 includes at a lower-most hierarchial level a number of sensors 204 and effectors 205. Generally, sensors 204 sense data and effectors 205 change data. In this embodiment, sensors 204 observe data of network devices located on the distributed network 103; the observed (monitored) data is received from network management (NM) process 105. Effectors 205 provide corrective actions to NM process 105 in order to modify configuration information in object 115 on network 103.

Figure 2:
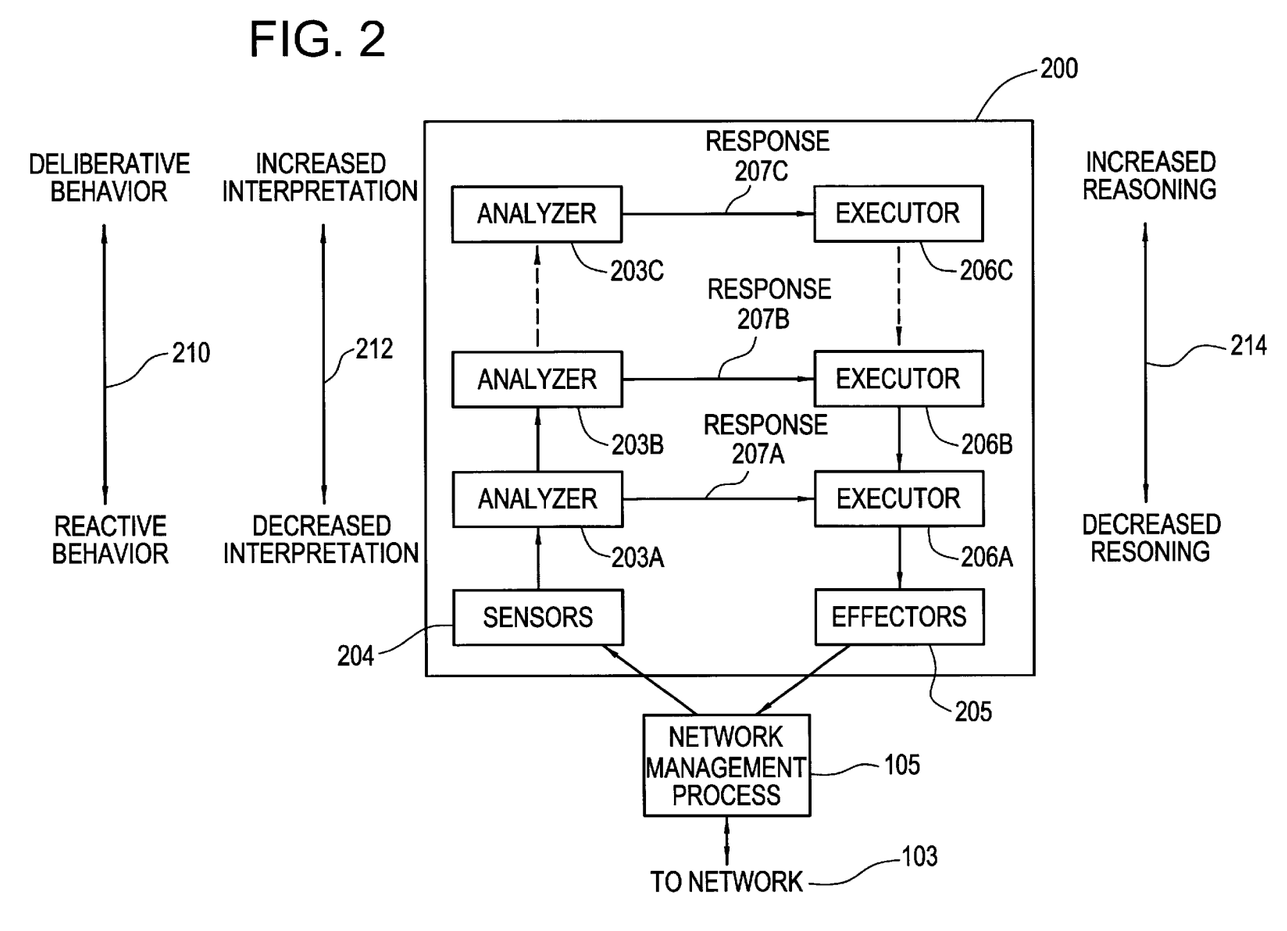
FIG. 2 is a functional block diagram of a configuration management system for implementing one embodiment of the invention.

The intelligent CM subsystem 200 includes, at a higher level, a number of analyzers 203 A–C that interpret data provided by the sensors 204 below. The data may be network management data such as performance data related to the performance of a device. The hierarchical series of analyzers 203 A–C, as a result of an interpretation of the data provided by the sensors 204, provide a number of responses 207 A–C to corresponding executors 206 A–C, a response being provided between an analyzer/executor pair on the same level of the hierarchy. The responses 207 may include new configuration data to be stored in a device. The executors 206 A–C are responsible for defining and executing corrective actions as a result of the response information generated by the analyzers 203 A–C. The higher level executors 206 A–C provide corrective information to the lower-level effectors 205 which, through network management process 105, modify configuration data within the corresponding NM agent 104 and/or the model of object 115 in NM system 102. The corrective information may be a new configuration record, with instructions as to the time of load and the effective time period of the new configuration.

The hierarchial system 200 illustrated in FIG. 2 allows varying levels of response, which are generally a function of the complexity of the problem and the desired response time. These varying levels of response are illustrated in FIG. 2 by three alternative double-headed arrows 210, 212 and 214. Arrow 210 illustrates reactive behavior (lower) vs. deliberative behavior (higher). Arrow 212 illustrates decreased interpretation (lower) vs. increased interpretation (higher). Arrow 214 illustrates decreased reasoning (lower) vs. increased reasoning (higher). These three levels of response are described in greater detail below.

Data received from a network management agent within a device may be acted upon in varying levels of response. Generally, intelligent behavior begins with an initial input of data and ends with instructions that are executed by effectors. Data received from NM agent 104 is provided as input to CM system 200 and may pass through one or more layers of interpretation. Each layer filters (removes) errored and/or extraneous data out of the data passed to it, and transforms the data into fewer (less), more informative pieces of data to formulate a response or pass data to the next layer above. Thus, at each layer of interpretation, the analyzer 203 located at that level may provide a response 207 to executor 206 based upon the interpretation and/or may pass data up to the next analyzer above.

When the data becomes manageable, that is, when collected data reaches a point where a response can be formulated, the data is compared with predefined knowledge about what instructions should ensue. This operation is usually defined as "responsiveness" and may be implemented in a number of ways, including simple look-up tables, expert systems, and/or neural networks. The output of the executors 206 is a set of instructions. These instructions may be decomposed down through the same levels of interpretation until they are executed by effectors 205.

As shown in FIG. 2, there may be separate control loops that respond to a specific class of problems, i.e., the problems are partitioned and assigned to levels according to the amount of time and the amount of information required to solve them. An example of a short-term loop is defined by the flow of data and commands from the NM process 105 to sensors 204, continuing up to analyzer 203A and across to executor 206A, then down effectors 205 to process 105. The instructions are communicated to network device(s) through network 103. The short-term interpretation/response/execution loop at this lowest level provides for quick reaction, bypassing upper level control mechanisms. In the context of network management, such tasks might include intelligent routing and temporary disconnection to a busy host.

A medium-term loop solves complex problems and operates on an increasingly interpreted input. The medium-term loop would include analyzer 203B, response 207B and executor 206B, in addition to process 105, sensors 204 and effectors 205; it would not necessarily require (but may utilize) lower level analyzer 203A, response 207A and executor 206A. A response 207B to an interpretation provided by analyzer 203B would be provided to executor 206B. An example suitable for a medium-term loop is the interpretation of an event stream which may result in an actuation of alarms. The task of the response module may be to correlate these alarms, where some alarms are real and others are apparent, and the problem is to distinguish between real and apparent alarms and suppress apparent alarms.

A long-term loop solves problems that require more time and/or more performance data to determine an answer. The long-term loop would include analyzer 203C, response 207C and executor 206C, in addition to process 105, sensors 204 and effectors 205; it would not necessarily require (but may utilize) one or more of 203A, 207A, 706A, 203B, 207B and 206B. A response 207C to an interpretation provided by analyzer 203C would be provided to executor 206C. An example of a long-term task would be the problem of deciding whether to move a host from one subnetwork to another. A host may be moved in one instance because a majority of the host's clients reside on the other subnetwork; moving the host to the other (client) subnetwork would thus decrease traffic on the link between the two subnetworks.

In summary, reactive behavior (lower level) is concerned with those problems whose upper bounds on response time is short, and operates on relatively uninterpreted input. In contrast, deliberate (higher level) behavior is concerned with those problems whose upper bounds on response time is relatively long, and operates on increasingly interpreted input. It should be understood from FIG. 2 that many levels of analysis and/or execution may be performed.

Another example of selecting between short-term and long-term responses is an analysis of router performance. In this example, a router in a network exhibits poor performance resulting in observable symptoms such as a high CPU utilization, lost packets, and aborted connections. After reviewing port and router processing statistics, it is determined that excess traffic is being forwarded to the router. A short term resolution of this performance problem may include reconfiguring the router with a new configuration to reduce incoming traffic. One way to reduce traffic is to reduce the number of allowed ports on the router to permit only one networks' packets to be forwarded by the router. This one network may be deemed to be a critical network by the network administrator. In effect, the new configuration eliminates all network traffic other than the network traffic flowing to and from the critical network. This short-term resolution frees up the router's resources to handle the critical network's packets more effectively, but may impede less critical network traffic from arriving at its destination.

A long-term solution for the router performance problem discussed above may include creating a long-term configuration that rearranges subnetworks and devices to balance the router load with respect to other networking devices. This long-term solution may require additional (higher level) analyses involving additional networking devices and hosts.

As shown in FIG. 2, the lower-level response loop 105, 204, 203A, 207A, 206A, 205, 105 provides a reactive behavior with a short-term response time, perhaps with a relatively small amount of interpretation of the information received from a network device. This lower level loop typically provides decreased reasoning, (e.g., a lower impact response, often with less execution required and with less breadth of consideration) than a higher level process. Higher-level response loop 105, 204, 203C, 207C, 206C, 205, 105 provides a more deliberate behavior requiring increased interpretation of data received from the network device. Similarly, this higher level response loop will produce an impact of broader breadth due to the increased scope of reasoning. In other words, the result of the higher level response loop will generally provide a more dramatic change to the configuration of the network device.

Higher level analyses may be performed manually or by a number of conventional analysis programs that are available. However, these conventional programs require data to be entered manually using complex models. The amount of processing time and storage requirements for these programs are often exorbitant and prohibitive for a large-scale network. Further, the network administrator must decide the configuration changes to be made.

To effectively analyze the performance of multiple devices in real time, a capacity planner is required. The capacity planner is a system that analyzes the performance of multiple devices and determines an appropriate performance balance between devices. Such a system is described in a U.S. patent application Ser. No. 08/855,222, filed on May 13, 1997, entitled APPARATUS AND METHOD FOR NETWORK CAPACITY EVALUATION AND PLANNING, which is hereby incorporated by reference in its entirety. Another system for analyzing network capacity is described in U.S. Pat. No. 5,706,436, issued to L. Lewis and U. Datta on Jan. 6, 1998, entitled APPARATUS AND METHOD FOR EVALUATING NETWORK TRAFFIC PERFORMANCE, which is hereby incorporated by reference in its entirety.

Figure 3:
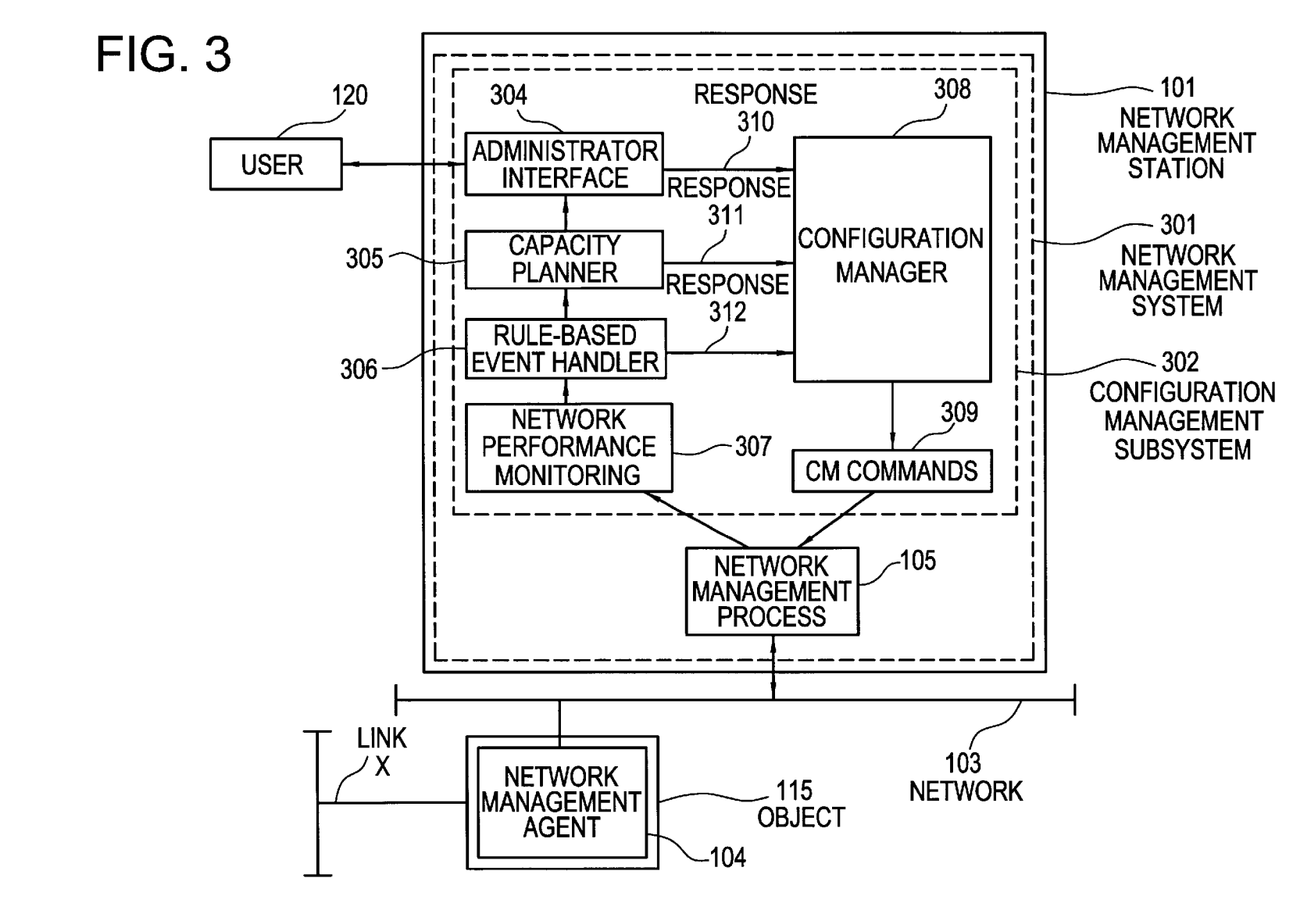
FIG. 3 is a block diagram of a portion of a network, including a network management system and agent implementing an embodiment of the invention.

FIG. 3 shows one embodiment of a network management station 101 including a network management system 301 which includes a hierarchical set of analyzers according to the present invention, one of which is a capacity planner. NM System 301 includes a configuration management (CM) subsystem 302. Analyzers 304–306 within CM subsystem 302 provide varying levels of responses 310, 311, 312 to a configuration manager 308. The configuration manager may include different levels of executors. Configuration manager 308 outputs CM commands 309 to modify NM agent 104. These CM commands 309 may be, for example, Command Line Interface (CLI) commands in the SPECTRUM NMS; these CLI commands provide access to the device database (e.g., the SpectroSERVER database available from Cabletron Systems, Inc.). Users may create scripts that execute one or more CLI commands. These scripts may be invoked from a command line, through a graphical user interface, or from a remote system. Scripts and their features are well-known in the art of computer programming.

A rule-based event handler 306 may be used to issue commands when certain events occur on the network. One such rule-based event handler 306 is the SPECTROWATCH event handler available from Cabletron Systems, Inc. Rules may be inserted in the rule-based event handler 306 to monitor traffic data or other network performance data, and execute a CM command 309 when a specific performance pattern occurs. For example, consider configuration management of a managed object such as a router. If a port on a router transmits data above a specified threshold for a specified time, the rule-based event handler 306 may consider this an important event and generate a response 312 describing the event and forward the response 312 to the configuration manager 308, in response to which a CM command 309 is executed that places a new, predefined configuration into the router. Similarly, when the traffic transmitted by the port goes beneath the threshold for a given amount of time, the original configuration may be loaded into the router.

It should be understood that any reactive analyzer may be used in lieu of or in addition to the rule-based event handler 306, such as a case-based reasoning structure, neural network analyzer, threshold function, model-based reasoning structure, or other analyzer that may be used to determine configurations in a reactive manner.

The capacity planner (CP) 305 as described above may be used as a midlevel analyzer for analyzing performance of a network device. The capacity planner 305 observes network performance statistics over a given period of time (e.g., a week), and attempts to determine a better network configuration based on the concept of network balance. In a supervised mode, the capacity planner may offer its results to the administrator through the administrator interface 304, whereby the user 120 responds with configuration management changes. In an unsupervised mode, the capacity planner 305 may send instructions directly to the configuration manager 308 for modifying the configuration of the NM agent 104.

In one embodiment, the capacity planner 305 analyzes capacity by determining a capacity measurement of a network link X. Link X may be, for example, a network link of a networking device 115. This capacity measurement is determined by computing the volume of network traffic for the link over a time period T. This volume information is collected in a table or database on the network management station 101. A bandwidth (BW), lower bound (LB) and upper bound (UB) are used to indicate "healthy" traffic. BW is an inherent property of the network link, while LB and UB values are subjective properties imposed on a link by the network administrator. The LB and UB values delimit a desired range of network traffic for optimal link performance.

The capacity planner computes the following parameters: BWT, V, ABU, COB, COT, and ELB. BWT, which indicates the capability of the link over period T, is computed by multiplying BW (the theoretical bandwidth) by period T. For example, if the BW of a network link is 100 bytes/sec and the monitoring period of the link is 60 seconds, then the value of the BWT parameter is 6000 bytes. The value of BWT indicates that the link can carry 6000 bytes during a 60 second period. The equation for BWT for a network link X may be represented as:

$$BWT(X)=BW(X) \times T \quad (1)$$

The ABU parameter indicates the average bandwidth usage of the link. The actual volume V of the link is determined by measuring traffic statistics for the link over a period T and stored on NM station 101. From the volume V and the capability BWT, the average bandwidth usage ABU for link X may be determined according to the following equation:

$$ABU(X)=V(X)/BWT(X) \quad (2)$$

Thus, average bandwidth usage ABU is the percentage of the total link capability that is currently being used over time period T. For example, a usage ABU of 5% would indicate that link X may be underutilized because during the time T only 5% of its capability is being used; this may represent excess capability and/or a suboptimal use of resources.

A contribution to overall bandwidth COB is determined for link X with respect to all of the bandwidth in the network (i.e., all of the links in a designated network portion), as indicated in equation (3):

$$COB(X) = \frac{BWT(X)}{\sum BWT(I)} \text{ where } I = 1, 2, \ldots N \text{ for } N \text{ nodes} \quad (3)$$

The nodes N include all of the nodes in the network.

Similarly, a contribution to overall traffic COT(X) is determined for link X with respect to all of the traffic in the network:

$$COT(X) = \frac{V(X)}{\sum V(I)} \text{ where } I = 1, 2, \ldots N \text{ for } N \text{ nodes} \quad (4)$$

The contribution to overall bandwidth COB defines a percentage of the bandwidth for a particular link X with respect to all bandwidth, while the contribution to overall traffic COT is a measure of the percentage of the actual traffic transmitted by the link X with respect to all traffic during the time T under consideration. Generally, if these percentages are similar for different links, then it means that the network is well-balanced with respect to both actual usage (traffic) and potential usage (bandwidth). Since a balanced network is generally desirable, these percentages may be used to determine the overall balance of a network.

These two contributions may also be compared with each other for a particular link X by taking a difference, to define an evaluation of link balance ELB for the particular link X according to equation (5):

$$ELB(X)=COT(X)-COB(X) \quad (5)$$

When the contribution to overall bandwidth COB is equal to the contribution to overall traffic COT for a particular link, there is an ideal balance, that is the link is providing its "fair share" of the overall workload of the network. If the evaluation of link balance ELB is negative, then the link is doing less than its fair share, and if the evaluation of link balance ELB is positive, then the link is doing more than its fair share. A system which further illustrates the concept of network balance is described in a U.S. patent application, Ser. No. 08/855,222, filed on May 13, 1997, entitled APPARATUS AND METHOD FOR NETWORK CAPACITY EVALUATION AND PLANNING, by U. Datta and L. Lewis, now U.S. Pat. No. 6,209,033 which is incorporated herein by reference in its entirety.

Figure 4:
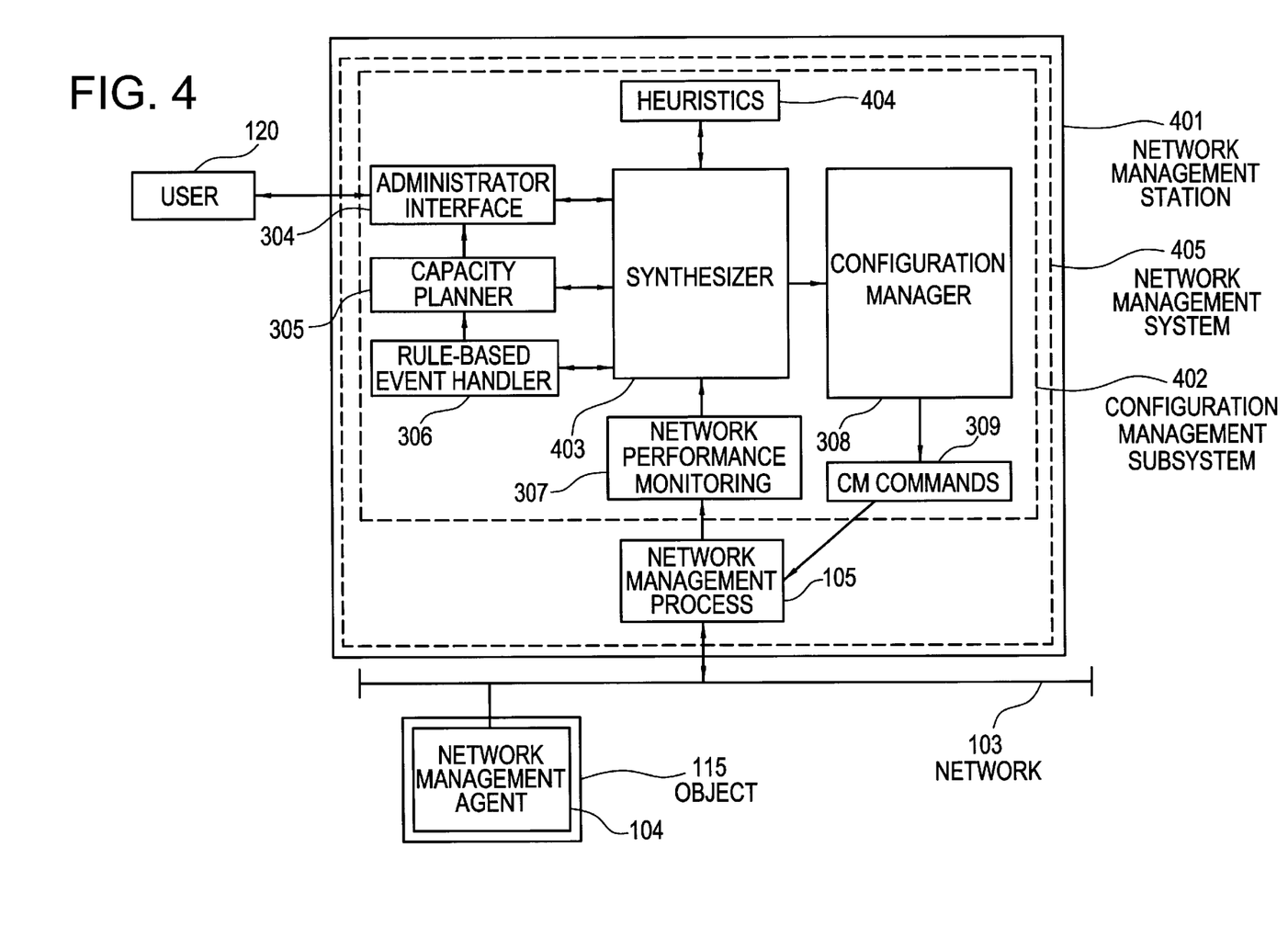
FIG. 4 is a block diagram for implementing another embodiment of the invention.

Another embodiment of the invention is shown in FIG. 4. A network management station 401 may include a network management system 405. The network management system 405 includes similar components to the network management system 301 (FIG. 3), wherein like reference numbers indicate similar devices. The NM system 405 includes a configuration management subsystem 402, which further includes a synthesizer 403 positioned between the analyzers (interface 304, CP 305, event handler 306) and configuration manager 308; the synthesizer makes decisions based on heuristics 404. A network performance monitoring block is positioned between synthesizer 403 and NM process 105. The synthesizer 403 acts as a "broker" (or decision maker) for passing problem information to various services for analysis and solution. Specifically, the synthesizer 403 provides a centralized control of determining configuration changes.

The centralized nature of the synthesizer 403 contrasts with the distributed processing (decentralized approach) of FIG. 3 for solving a configuration management problem. In addition, the synthesizer 403 allocates resources based upon a traffic flow problem and combines solutions of service providers, such as the capacity planner 305 and/or rule-based event handler 306. The synthesizer 403 also resolves conflicts in configuration data, based on heuristics 404. For example, the synthesizer 403 may resolve a configuration conflict between agents such as the capacity planner 305 and the rule-based event handler 306. As discussed above, it should be understood that any analyzers may be used in association with synthesizer 403.

Heuristics 404 contains learned data (e.g., concerning network performance) that may influence a response to the configuration manager 308. Data obtained by heuristics 404 may be loaded before operation of NM station 401 from a storage having predefined data, or may "learn" appropriate responses from data provided from devices on network 103. Learning systems are well known in the art of artificial intelligence.

Generally, the synthesizer 403 may determine an optimum "plan" for resolving an undesirable state in a managed object. A plan is a specification for performing an action that maps (correlates) what is known at the time of execution of the plan to a set of actions, wherein an action is a response. The plan generally leads to a "goal" which is a subset of the set of all states such that a plan is judged successful if it results in the system ending up in a state that is part of the goal subset. The operation of determining the resulting state, given an initial state and an action is termed "progression." Therefore, based on a set of actions defined as a "plan," the synthesizer 403 attempts to achieve a goal state for the managed object. These "plans" or sets of actions may be implemented as configuration changes in the managed object. Also, plans may be "learned" through trial and error, or other learning process wherein configuration changes provide a measurable change in performance of the managed object.

Figures 5A, 5B, 5C:
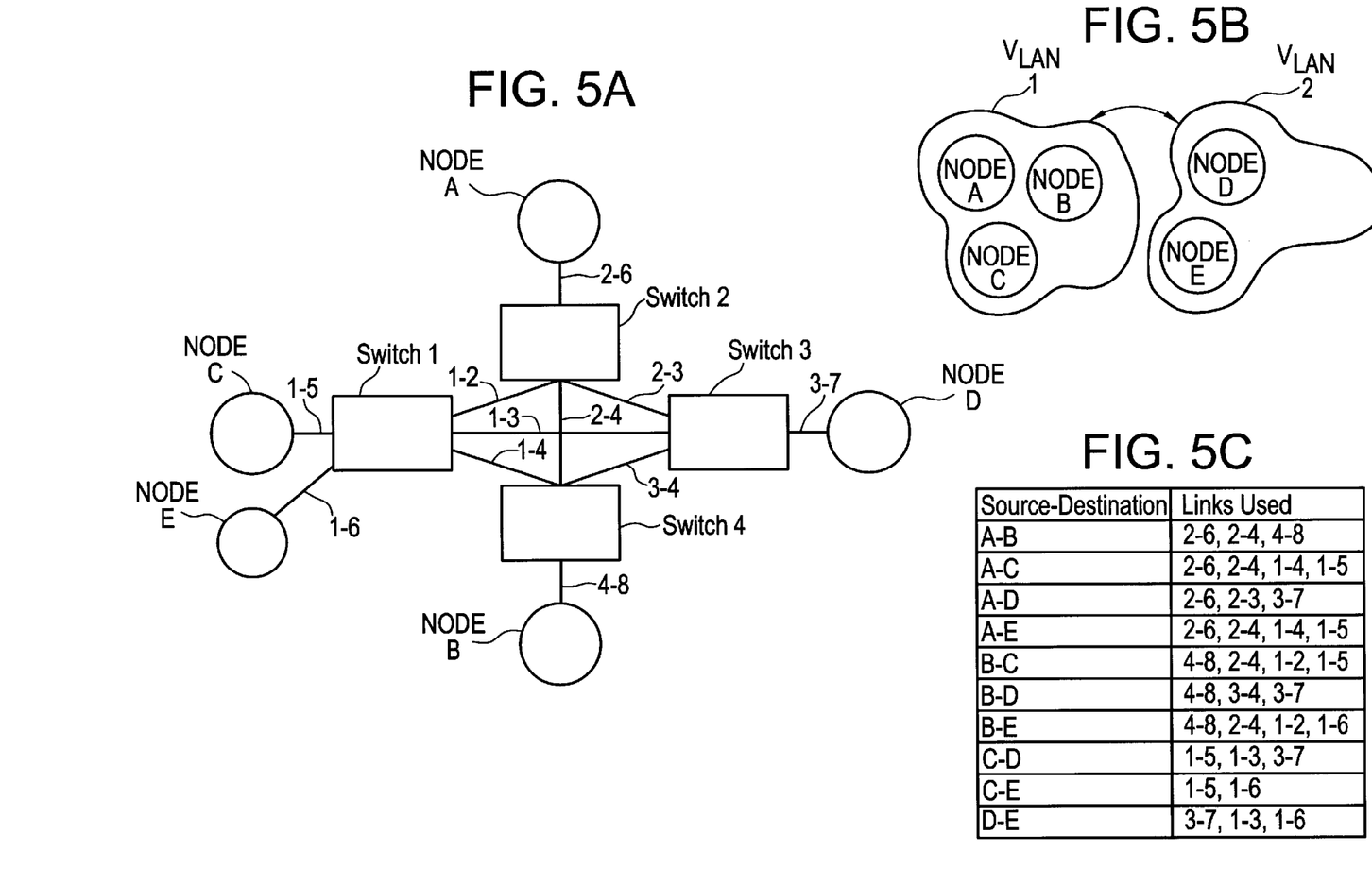
FIGS. 5A–5C show an exemplary network to be managed.

As a result of computing network balance, the capacity planner 305 or synthesizer 403 may determine an alternate configuration of the network. The alternate configuration may be implemented through automatically distributing configuration changes to various managed objects such as network switches. For example, nodes A–E may be physically connected in the network by switches 1–4 as shown in FIG. 5A. Also, nodes/devices A, B, and C may logically be members of a virtual LAN 1 (VLAN 1), and nodes D and E may be members of VLAN 2 as shown in FIG. 5. Further, data communicated between the nodes may be transmitted between nodes and switches through a number of communication links. The communication links used for a communication between two nodes may be defined by configurations of the switches 1–4. An example list of the links used by nodes A–E is listed in FIG. 5C.

An example of a situation where long-term analysis of network conditions may not be required is evaluating communication paths used between nodes. As shown in the table of FIG. 5C, communication between nodes B and C traverse links 4–8, 2–4, 1–2, and 1–5. As shown by FIG. 5A, the number of links traversed may be decreased by using link 1–4 instead of links 2–4 and 1–2. Thus, the switches 1 and 4 may be instructed by NM systems 301 or 405 to forward packets over link 1–4.

An example of when long-term analysis may be required is evaluating the utilization of the network links over a period of time to determine optimum traffic patterns (determine network balance) through switches 1–4 as discussed above. This evaluation may be performed by capacity planner 305 or synthesizer 403.

As discussed above, conflicts may occur between configurations determined by different analyzers. If there is a conflict between configurations, a conflict resolution strategy may be implemented to determine the configuration implemented in the device. A system for conflict resolution is described in U.S. patent application Ser. No. 08/622,866 entitled POLICY MANAGEMENT AND CONFLICT RESOLUTION IN COMPUTER NETWORKS, filed Mar. 29, 1996 by S. Thebaut et al. now U.S. Pat. No. 5,889.953, which is hereby incorporated by reference. If a conflict exists, a configuration determined by deliberative analysis may be given precedence over a reactive analysis, or vice versa. It should be understood that other conflict resolution strategies may be used.

Another situation that may involve long-term planning includes reassigning nodes to VLANs. For example, referring now to FIG. 5B, if capacity planner 305 and/or synthesizer 403 determines that node C performs a majority of its communications with nodes D and E and would be better suited in VLAN2, capacity planner 305 and/or synthesizer 403 may issue commands to the network switches 1–4 as needed to perform a reassignment of node C to VLAN2.

Figure 6:
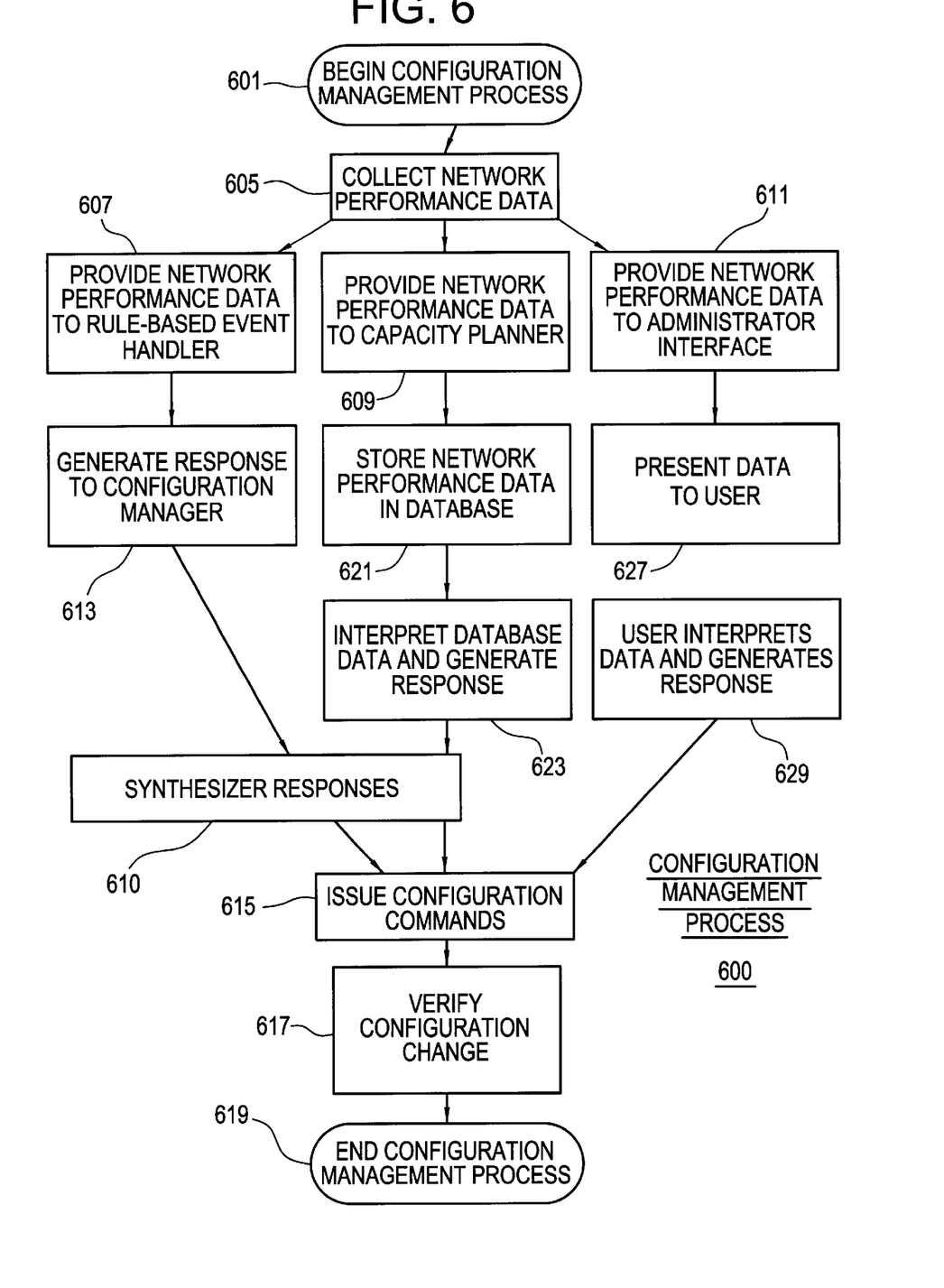
FIG. 6 is a flow chart of a configuration management process according to the invention.

A configuration management (CM) process 600 is shown in FIG. 6. In one embodiment, this process is performed by the CM system 302 shown in FIG. 3. At step 601, the configuration management process 600 begins. For this example, it is assumed that a management record exists for the device before performing process 600. This CM record may be created manually from data provided by an administrator or automatically through a network discovery process. Creation of configuration records are well-known in the art of network management. A default record may be used based upon the device type, such as a router, wherein values for specific attributes are stored. Once a configuration record is created for the device, process 600 may begin collecting performance data associated with the device at step 605.

The performance data may be provided to a number of processes, which may alter, filter, or add information to the performance data. For example, the performance data may be provided to a rule-based event handler (step 607), to a capacity planner (step 609), or to an administrator interface (step 611). These steps may be performed by the rule-based event handler 306, the capacity planner 305, and the administrator interface 304. The performance data may be specific parameters measured from the network, or may be overall performance figures of merit, for example those derived by combining measured parameters or performing other processing or interpretation of the measured parameters. Although several examples herein have been described with respect to traffic data, other data may also be measured and interpreted, such data being selected based upon the particular network characteristics. Other such data includes data throughput rate, response time, error rate, error correction rate, port availability, port usage, amount of packets dropped, and amount of packets delayed.

As discussed above, the rule-based event handler 306 may generate a response 312 based upon the performance data provided by the network performance monitoring 307; the response 312 is sent to the configuration manager 308. Specifically, the rule-based event handler monitors values of attributes within the performance data. In response to step 607, if a monitored value matches a rule in a rule set of the rule-based event handler rulebook, the event handler 306 may generate a response at step 613. This response may include defining new configuration data and loading parameters wherein the configuration manger 308 provides a new configuration to the device 115 based upon the parameters.

In step 615, the configuration manager 308 issues configuration commands 309 to modify the configuration of the device in response to the execution of step 613, step 623, or step 629. In one particular embodiment shown in FIG. 6, the responses from steps 613 and 623 are synthesized together (step 610) to generate a combined response based upon event handling and capacity planning, and the combined response is provided as an input to step 615. In one embodiment, modification of the device configuration is facilitated through the NM process 105, using a well-known network management protocol, to issue communication configuration commands 309 to NM agent 104. Values of attributes in NM agent 104 correspond to actual configuration settings in the device. When changed, the values change configuration settings in the device.

At step 617, following step 615, the process may verify that the configuration commands were performed, that is, the changes to the device configuration were executed. Verification of the configuration may be performed simply by comparing the attribute values of the desired configuration to the attribute values of the current configuration determined through polling NM agent 104. At block 619, one cycle of the configuration management process 600 ends. It is noted that many cycles of process 600 may be performed in series or in parallel, wherein CM system 302 performs process 600 upon receipt of new performance data from the NM process 105 or input from a user 120.

Also, as discussed above, the capacity planner 305 may store performance data in a database or file located on the NM systems 301, 405. Alternatively, the database may be stored in memory or in another location in the network 103.

At step 607, process 600 provides performance data to the rule-based event handler 306. The rule-based event handler 306 compares performance data to individual rules within a rules database. In an embodiment in which the performance data is traffic data, the rules may be based upon traffic statistic variables. If predetermined criteria for a rule is met, the rule-based event handler 306 generates an appropriate response to the configuration manager at step 613. An appropriate response may be determined by a network expert or network administrator and entered into the rules database.

At step 609, process 600 provides performance data to the capacity planner 305. The capacity planner stores performance data as historical information in a capacity planner database at step 621. Then if enough performance data has been collected, the capacity planner will interpret the capacity planner database data and generate an appropriate response at step 623. The capacity planner generates a response based upon a network reconfiguration which is based in turn upon the concept of network balance discussed above. It should be understood that different responses may require different amounts of performance data. As in the rule-based event handler, an appropriate response may be determined by a network expert or network administrator for varying levels of network balance.

Process 600 may provide an optional series of steps by which a network administrator may provide input to process 600. At step 611, for example, process 600 may provide performance data to the administrator interface 304, and at step 627, the performance data is presented to the user. The user interprets the performance data and generates a response at step 629. The user is allowed to enter their own configuration management changes based upon performance data. Administrator interface 304 may present the data in a form that may be easily interpreted by a user.

While various embodiments of the present invention have been described above, it should be understood that they have been presented by way of example only, and not limitation.

Thus, the breadth and scope of the present invention are not limited by any of the above-described exemplary embodiments, but are defined only in accordance with the following claims and their equivalents.

What is claimed is:

1. A configuration management system for automatically controlling a configuration of an object in a communications network, the configuration management system comprising:
   a performance monitor that monitors the network and provides as an output performance data of the network;
   an event handler, that receives the performance data and evaluates the performance data based upon a set of rules and having as an output a rule evaluation of the performance data;
   a capacity planner that receives the performance data of the network and evaluates the performance data based upon network performance and having as an output a capacity evaluation of the communications network; and
   a configuration manager, receiving the output of the event handler, and the output of the capacity planner, and providing an output command based on the rule evaluation and the capacity evaluation.

2. The configuration management system of claim 1, wherein the configuration manager is constructed and arranged to verify the success of the command to the object by determining whether performance of the communications network has improved subsequent to the command being provided to the object.

3. The configuration management system of claim 1, wherein the configuration manager includes synthesizer having a first input that receives the rule evaluation from the output of the event handler, a second input that receives the evaluation of the capacity from the output of the capacity planner, and an output that provides a single synthesized network evaluation to the configuration manager, the configuration manager providing the command to the object in response to the single synthesized network evaluation.

4. The configuration management system of claim 3, wherein the synthesizer is constructed and arrange to resolve inconsistencies between the evaluation of the capacity and the rule evaluation.

5. The configuration management system of claim 1, wherein the command from the configuration manager includes a configuration command that changes a configuration of the object.

6. A method for configuring a network device in a communications network, the method comprising the steps of:
   a) collecting performance data from the communications network;
   b) evaluating the performance data according to a set of rules to generate a rule evaluation;
   c) determining a capacity evaluation of the network;
   d) determining a new configuration for the network device based upon the rule evaluation and the capacity evaluation; and
   e) reconfiguring the object based on the new configuration.

7. The method of claim 6 further comprising a step of verifying success of step e).

8. The method of claim 7, wherein the step of verifying includes determining whether the network has improved performance subsequent to the object being reconfigured in step e).

9. The method of claim 6, wherein the step of reconfiguring the object includes issuing configuration commands to the object.

10. The method of claim 6, further comprising the steps of:
- determining a new configuration for the object based upon the capacity evaluation; and
- reconfiguring the object based on the new configuration.

11. The method of claim 6, wherein step d) includes synthesizing the rule evaluation with the capacity evaluation to provide a single synthesized network evaluation.

12. The method of claim 11, wherein the step of synthesizing includes resolving an inconsistency between the rule evaluation and the capacity evaluation.

13. An apparatus for configuring a network device in a communications network, the apparatus comprising:
- means for collecting performance data from the communications network;
- means for evaluating the performance data according to a set of rules to generate a rule evaluation;
- means for determining a capacity evaluation of the network;
- means for determining a new configuration for the network device based upon the rule evaluation and the capacity evaluation; and
- means for reconfiguring the object based on the new configuration.

14. The apparatus of claim 13, further comprising means for verifying success of the new configuration.

15. The apparatus of claim 14, wherein the means for verifying includes means for determining whether the network has improved performance subsequent to the object being reconfigured by the means for reconfiguring.

16. The apparatus of claim 13, wherein the means for reconfiguring the device includes means for issuing configuration commands to the object.

17. The apparatus of claim 13, further comprising:
- means for determining a new configuration for the object based upon the capacity evaluation; and
- means for reconfiguring the object based on the new configuration.

18. The apparatus of claim 13, wherein the means for determining a new configuration for the object includes means for synthesizing the rule evaluation with the capacity evaluation to provide a single synthesized network evaluation.

19. The apparatus of claim 18, wherein the means for synthesizing includes means for resolving an inconsistency between the rule evaluation and the capacity evaluation.

20. A method of configuring an object in a communications network, the method comprising the steps of:
- a) collecting performance data from the object;
- b) analyzing the performance data, wherein the analyzing step includes a step of analyzing an event received from the object and a step of analyzing a capacity of the network;
- c) based on results of step b), determining a configuration of the object; and
- d) reconfiguring the object based on the configuration determined in step c).

21. A method of configuring an object in a communications network, the method comprising the steps of:
- a) collecting performance data from the object;
- b) analyzing the performance data, wherein the analyzing step includes a step of reactively analyzing the performance data and a step of deliberatively analyzing the performance data;
- c) based on results of step b), determining a configuration of the object; and
- d) reconfiguring the object based on the configuration determined in step c).

* * * * *